Dec. 8, 1953 H. S. WOLFF ET AL 2,661,902

APPARATUS FOR COUNTING MICROSCOPIC PARTICLES

Filed Jan. 10, 1951

HEINZ SIEGFRIED WOLFF
MARJORIE GRACE STORY
DERICK JACOB BEHRENS
*Inventors*

*By*

Robert B Larson *Attorney*

Patented Dec. 8, 1953 2,661,902

UNITED STATES PATENT OFFICE 2,661,902

APPARATUS FOR COUNTING MICROSCOPIC PARTICLES

Heinz Siegfried Wolff, Oxford, and Marjorie Grace Story and Derick Jacob Behrens, Strand, London, England, assignors to The National Research Development Corporation, London, England Application January 10, 1951, Serial No. 205,278

Claims priority, application Great Britain January 10, 1950

5 Claims. (Cl. 235—98)

Figure 1:
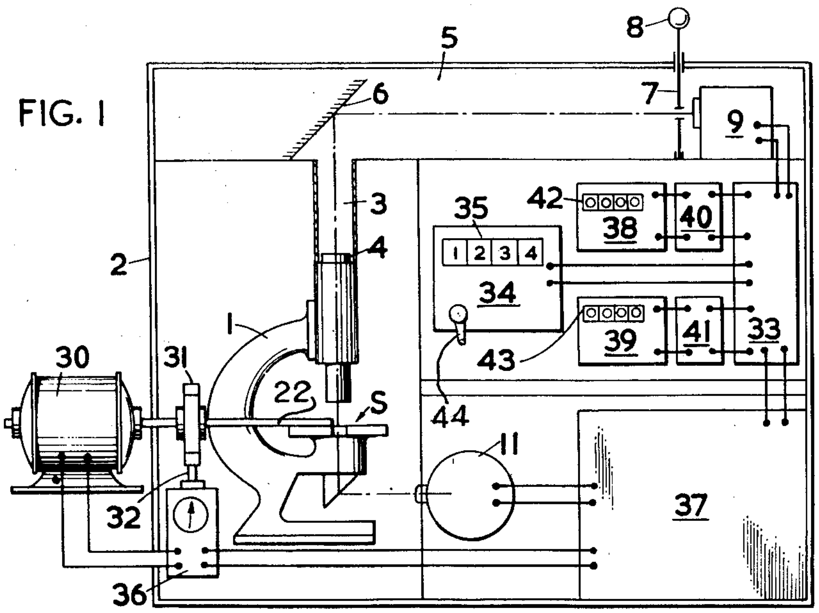

This invention relates to the enumeration of bodies in a state of irregular distribution in a medium, particularly of two dimensional random distribution, for example, particles which have settled out of a fluid suspension and particles suspended in a fluid film.

It has a primary application in the estimation of the corpuscular content of blood, by the counting of blood cells, and will be described with particular reference to such estimation, but it is also applicable to any case where the suspended or deposited particles are resolvable by optical means and have sufficient contrast.

In order to monitor the blood conditions of beings exposed to radiation, and to measure radiation effects on animals, accurate and detailed records of blood analysis over extended time periods are required. Hitherto the analysis has been carried out by visual inspection of blood specimens with the aid of a microscope and the telling of the cells within areas marked by graticules on special counting chambers. Such counting is exceedingly tedious and hence unsuitable for routine testing.

It has also been found that due to the small number of cells actually counted, the consequent error was such as possibly to obscure symptoms of clinical importance.

It is of note however that during a visual count it is possible to distinguish between single cells, and two cells overlapping, and to compensate for cells only partially within the area defined by the graticules. This is usually done by counting all cells overlapping two adjacent sides, and neglecting all those overlapping the remaining two sides.

The use of mechanical detectors and counters presents difficulties arising from these requirements and from the non-uniform size of the cells. If a small area of a sheet-like specimen be illuminated in such a way so as to make the cells either appear as light sources, or as light absorbers, the total quantity of light emitted or absorbed is not a measure of the number of cells in view of their non-uniformity of size.

If the area be scanned, that is examined element by element so that each cell or part of a cell produces a pulse in a light sensitive device, there is no discrimination between cells wholly within and those only partially within the element, hence the pulse count will be in error. Since for sufficient resolution of the cells the width of a scanning line must be of the same order as the cell diameters this error is large.

We have however formulated a relationship between the actual number of cells in a scanned area, and the number counted by scanning (that is, the number including those which lie only partly within a scanning line), whereby we are enabled to devise mechanical means for counting with useful accuracy.

The relationship is that, if $n_c$ cells of diverse size are counted wholly or partially within a long strip of length $y$ and width $x$ in a sheet or film, then the true number of cells per unit area is $$\frac{1}{y}\partial\frac{n_c}{\partial x}$$

We utilise the relationship by scanning strips of different widths and measuring the rate of change of count with width.

In a simplified form, the relationship is that if two equally long strips of different widths be scanned, each count will err by including border line cells indiscriminately, and the errors will be equal when the strips are long. The difference in counts consequently gives accurately the number of cells in the area difference of the strips. The strips need not in fact be of equal length since the counts per unit length can be used to give difference values.

The invention accordingly resides in a method of counting bodies in a state of random distribution on a surface comprising scanning strips of different widths and counting the bodies wholly or partially appearing in the scanned strips so that the rate of change of the counts with respect to width may be determined.

The invention also resides in apparatus for such counting comprising means for scanning strips of different widths of a sheet specimen or of an optically projected image thereof, a detector responsive to individual bodies appearing in the scanning of the strips to produce electrical pulses, and a counter for indicating or recording the pulses.

The apparatus may be arranged to indicate or record counts simultaneously or in succession, each count referring to a particular width of strip, so that the true content may be deduced from the indications or records. Alternatively the apparatus may be arranged itself to evaluate and indicate or record the true content.

In one way of giving effect to the invention, an optical system is arranged to project a magnified image of a diluted blood sample on a screen, the specimen being illuminated so that the blood cells appear as bright discs or rings on a darker background, or as dark discs on a bright background. Provision is made for scanning the image in a series of strips of a width of the order of the maximum projected cell diameter and then in a series of strips of different widths but of the same order, for example twice the first width. The dimension of the scanning aperture in the direction of scan is arranged to be of the order of maximum projected cell diameter for bright cells on a dark background, or small compared with the projected cell diameter in the case of dark cells on a bright background. Each cell image appearing in the scanning aperture gives rise to an electrical impulse in a photo-cell. These impulses are amplified and applied to an electronic counter which indicates the total count for each width of scanning line. The slope of the resulting curve is a measure of the number of cells in unit area of specimen.

For the relationship given in the foregoing to be true, certain conditions have to be fulfilled.

First the dilution has to be such as to reduce to a very small figure the probability that any two cells will be closer together than the maximum dimension of the scanning element.

Secondly the construction of the counting chamber must be such that on filling it with a well mixed suspension of cells a truly random distribution is obtained.

In the absence of any bias tending to orientate noncircular bodies in any particular direction no error will be introduced by cells not being perfectly circular.

In any case an effectively circular image of noncircular bodies can be projected by a measure of defocussing in the optical system.

The orders of magnitude of the quantities involved in blood cell counting are as follows: The average diameter of white cells is of the order of 10 microns and the average number per cubic millimetre of undiluted blood is of the order of 4,000 to 12,000.

The range of red cell diameters is from 5-13 microns with an average value of 7 microns. The normal number per cubic millimetre is about 5,000,000. If specimens .1 millimetre thick are used, as is current practice, the respective dilutions have to be about 10 and 1,000.

It will be seen that with such dilutions a considerable area has to be scanned to count a sufficient number of cells to give useful accuracy. Since it is not practicable to make the specimen much longer than 3 cms. we arrange to scan a number of uniformly wide strips sufficient to provide the necessary area.

The slide may be illuminated in such a way that the cells appear as bright refractable bodies on a dark background, or as dark bodies on a bright background.

Figure 2:
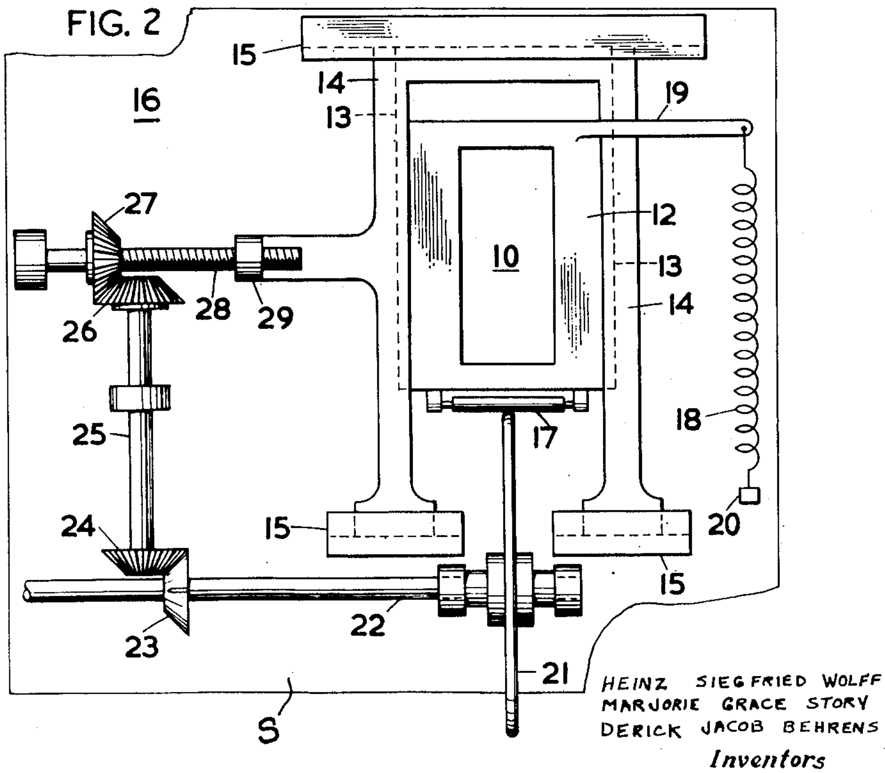

One practical embodiment of the invention for counting the red blood cells in a diluted blood specimen will now be described with reference to the accompanying drawing in which Figure 1 is a front elevation of a blood cell counter and Figure 2 is a plan view to a larger scale of the mechanical scanning arrangement S of Figure 1.

In Figure 1, 1 is a conventional microscope mounted in a box-like rack 2 and having a tubular extension 3 fitted to its eye piece 4 and communicating with a tunnel 5 along which light from the eyepiece is projected, after reflection from a mirror 6, to form an enlarged image upon a shutter 7 in which is a rectangular aperture. The width of the aperture is a little more than the average diameter of the image of a red blood cell of the specimen and is therefore about 10 x 500 microns or 5 mm. for a magnification of 500. The length of the aperture is twice the width i. e. about 10 mm. and the shutter is arranged so that it can be turned in its own plane through an angle of 90° by means of a handle 8. Beyond the shutter 7 is a photo-electric cell 9 of the photo-multiplier type which produces a pulse when the dark image of a blood cell appears in the aperture.

The diluted blood specimen is used in a counting chamber 10 (Figure 2) of a type already in use, comprising a slide with three parallel optically ground surfaces on it, the middle one being separated from the others by grooves ground into the glass. The middle surface is 0.1 millimetre below the level of the two outer surfaces, so that if an optically worked cover slip is pressed into intimate contact with the outer surfaces a central cavity is left into which the blood sample is introduced from a diluting pipette by capillary attraction. In this way a sheet-like cavity about 3 cms. long, 1 cm. wide, and 0.1 millimetre deep is defined.

The counting chamber is illuminated by transmitted light from a lamp 11 (Figure 1) to give the dark images on a light background and is supported on a scanning arrangement S which is shown more clearly and in plan in Figure 2. The said chamber is supported on a holder 12 (Figure 2) which is slidable in guides 13 in a frame 14. The frame 14 is in turn slidable in guides 15 secured to a base plate 16.

The holder 12 is fitted with a roller 17 which is urged by a tension spring 18, extending between a bracket 19 on the holder 12 and a lug 20 on the base plate 16, into contact with a cam 21 fixed on a shaft 22. Rotation of the shaft 22 thus causes the holder 12 to slide backwards and forwards in it guides 13 and the shape of the cam is such that the speed of the slide is constant over a major portion of its movement.

The frame 14 is traversed one step, each time the holder 12 changes direction, by an intermittent drive comprising a bevel wheel 23 having but two teeth, one at each end of a diameter, in driving engagement with a bevel wheel 24 having a full set of teeth. Bevel wheel 24 is fixed to a shaft 25 which drives, through further bevel wheels 26 and 27, the screw 28 of a screw and nut device, the nut 29 whereof is fixed to the frame 14. The amount of lateral traverse per step is about 0.1 mm. so that a completely fresh strip of the specimen is scanned and the cells therein counted at each pass of the slide.

The shaft 22 is driven by a constant speed electric motor 30 (Figure 1) and also carries a commutator device 31 having four equal segments engaged by a brush 32. Alternate pairs of the segments are connected together and one set is arranged to short circuit the input of an amplifier 33 for the photo-multiplier tube 9. The amplifier 33 feeds a scaling and counting unit 34 which indicates on a mechanical register 35 the number of impulses received from the tube 9. The commutator device 31 ensures that counting only takes place during the time the slide is moving at a constant speed and not when accelerating, decelerating, or traversing. The said device 31 is also arranged to operate a line counter 36 incorporating a remote contactor for controlling the motor 30. The line counter 36 is of the type which can be set to switch off the motor after a predetermined number of lines have been counted. A suitable power supply for the apparatus is derived from a power supply unit 37.

In operating, the register 35 is set to zero and the line counter 36 is set to switch off the motor 30 after, say, 200 lines. The shutter 7 is then turned by means of its handle 8 so that the aperture is arranged with its length across the line of movement of the image, i. e. so that a wide (20 micron) strip will be scanned, and the motor is switched on. When the motor stops after 200 lines the shutter is turned so that a narrow (10 micron) strip will be scanned and the drive to the mechanical register is reversed by means of lever 44 so that a further count will subtract from the indication already showing. The motor is then re-started and when it again stops after 200 lines the indication on the register is the difference between the counts along the wide and narrow strips. This difference is the correct count for two hundred 10 micron strips since the edge errors have been eliminated as hereinbefore explained.

Since the sensitivity of the detecting apparatus is finite, some cells which lap but very little over the strip boundary are not counted. This does not introduce an error because width differences are taken in evaluating the count.

It is essential, however, that the sensitivity remains constant and any suitable known means may be employed for the purpose. In the example described the use of a single rectangular aperture for determining both the narrow and wide strips by the process of rotating the aperture through a right angle ensures that the same amount of background light is transmitted when scanning either width of strip. The arrangement also ensures that substantially the same sensitive area of the photomultiplier tube is used in each case. The sensitivity of the tube itself is maintained constant in the above described embodiment by stabilising the anode current of the tube through a network having a time constant which is long compared with the width of the pulses. In order to prevent dust particles which may settle on the cover slip of the counting chamber from affecting the count, an object lens of long focal length is used so that the cover slip may be thick enough to bring the dust particles outside the limits of the depth of focus.

The apparatus may be arranged to count particles of a particular size range or to sort the particles into a number of size ranges by means of a pulse width discriminator of the type shown for example in United States Patent No. 2,484,352. For example, additional counters 38 and 39 each preceded by respective pulse width discriminators 40 and 41 and having a respective register 42 and 43 may be provided for counting particles of two particular size ranges. It can be shown that the relationship between the actual number of particles counted and the true count upon which the invention is based holds good for any size range.

We claim:

1. Apparatus for counting bodies in a state of random distribution on a surface comprising, means for scanning a plurality of long strips of different widths on said surface, a detector associated with said scanning means for producing an electrical pulse in response to each body and to each part body appearing in the scanned strips, and means for counting the pulses in the strips of each width.

2. Apparatus as claimed in claim 1, wherein two series of strips, the strips of one series being twice the width of the other series, are scanned in succession strip by strip whereby a true count for the area of the narrow strips is obtained by deducting the count for the narrow strips from the count for the same number of the wide strips.

3. Apparatus as claimed in claim 2 wherein the means for counting the pulses is provided with reversing means whereby the count for the narrow strips is deducted mechanically from the count for the wide strips.

4. Apparatus according to claim 1 wherein said scanning means comprises, in combination, a fixed optical system and a mechanical device for moving the surface to be scanned in its own plane, said optical system including a microscope adapted to project a magnified real image of the bodies to be counted upon a shutter formed with an aperture which determines the width to be scanned, wherein said aperture is rectangular and the width of the strip being scanned is altered by rotating the shutter in its own plane through a right angle.

5. Apparatus as claimed in claim 1, wherein means are provided for discriminating between pulses of different width whereby the counted bodies may be size sorted.

HEINZ SIEGFRIED WOLFF.
MARJORIE GRACE STORY.
DERICK JACOB BEHRENS.

References Cited in the file of this patent

UNITED STATES PATENTS

| Number | Name | Date |
|---|---|---|
| 1,974,522 | Twyman et al. | Sept. 25, 1934 |
| 2,037,044 | Reinartz et al. | Apr. 14, 1936 |
| 2,073,246 | Merrick | Mar. 9, 1937 |
| 2,088,297 | Koenig, Jr. | July 27, 1937 |
| 2,369,577 | Kielland | Feb. 13, 1945 |
| 2,413,965 | Goldsmith | Jan. 7, 1947 |

OTHER REFERENCES

Popular Science Magazine, page 170, May 1949.